United States Patent
Nakamura

(10) Patent No.: US 9,473,671 B2
(45) Date of Patent: Oct. 18, 2016

(54) METHOD FOR PERFORMING DITHER PROCESSING

(71) Applicant: CANON KABUSHIKI KAISHA, Tokyo (JP)

(72) Inventor: Yasuyuki Nakamura, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/244,731

(22) Filed: Apr. 3, 2014

(65) Prior Publication Data

US 2014/0300934 A1    Oct. 9, 2014

(30) Foreign Application Priority Data

Apr. 8, 2013 (JP) ................. 2013-080804

(51) Int. Cl.
*H04N 1/405* (2006.01)

(52) U.S. Cl.
CPC ..................... *H04N 1/405* (2013.01)

(58) Field of Classification Search
CPC ............. H04N 1/4053; H04N 1/4051; H04N 1/4052; H04N 1/32203; H04N 1/32256; H04N 1/32309; H04N 1/4055; H04N 1/52; H04N 1/405; H04N 1/4058
USPC .......... 358/3.16–3.21, 3.13–3.14, 3.06–3.08, 358/1.9, 2.1, 500, 504, 400, 406, 468; 382/269–270, 260–266, 172
See application file for complete search history.

(56) References Cited

U.S. PATENT DOCUMENTS

| | | | |
|---|---|---|---|
| 6,278,530 B1 * | 8/2001 | Ulichney et al. | 358/3.13 |
| 2003/0081259 A1 * | 5/2003 | Toyoda et al. | 358/3.16 |

FOREIGN PATENT DOCUMENTS

| | | | |
|---|---|---|---|
| JP | 10051637 A | * | 2/1998 |
| JP | 2008-87196 A | | 4/2008 |

* cited by examiner

*Primary Examiner* — Thomas D Lee
*Assistant Examiner* — Stephen Brinich
(74) *Attorney, Agent, or Firm* — Canon USA, Inc. IP Division

(57) ABSTRACT

In a case where dither processing is performed as image forming processing, a reference position of a dither matrix to be used is changed in units of predetermined printing execution. Such a change prevents continuous lighting of a light emitting element and fixation of a lighting position, and suppresses speed of deterioration in the light emitting element with time.

6 Claims, 16 Drawing Sheets

FIG.6

| 147 | 120 | 93 | 80 | 107 | 134 | 150 | 123 | 96 | 83 | 110 | 137 |
|---|---|---|---|---|---|---|---|---|---|---|---|
| 228 | 187 | 26 | 0 | 53 | 201 | 231 | 190 | 29 | 3 | 56 | 204 |
| 214 | 174 | 40 | 13 | 67 | 161 | 217 | 177 | 43 | 16 | 70 | 164 |
| 89 | 116 | 143 | 153 | 126 | 99 | 86 | 113 | 140 | 162 | 134 | 104 |
| 9 | 62 | 210 | 234 | 193 | 32 | 6 | 59 | 207 | 243 | 202 | 36 |
| 22 | 76 | 170 | 220 | 180 | 46 | 19 | 73 | 167 | 230 | 189 | 49 |

FIG.8A

DITHER MATRIX
REFERENCE
POSITION

| 137 | 147 | 120 | 93 | 80 | 107 | 134 | 150 | 123 | 96 | 83 | 110 |
|---|---|---|---|---|---|---|---|---|---|---|---|
| 204 | 228 | 187 | 26 | 0 | 53 | 201 | 231 | 190 | 29 | 3 | 56 |
| 164 | 214 | 174 | 40 | 13 | 67 | 161 | 217 | 177 | 43 | 16 | 70 |
| 104 | 89 | 116 | 143 | 153 | 126 | 99 | 86 | 113 | 140 | 162 | 134 |
| 36 | 9 | 62 | 210 | 234 | 193 | 32 | 6 | 59 | 207 | 243 | 202 |
| 49 | 22 | 76 | 170 | 220 | 180 | 46 | 19 | 73 | 167 | 230 | 189 |

FIG.8B

DITHER MATRIX
REFERENCE
POSITION

| 110 | 137 | 147 | 120 | 93 | 80 | 107 | 134 | 150 | 123 | 96 | 83 |
|---|---|---|---|---|---|---|---|---|---|---|---|
| 56 | 204 | 228 | 187 | 26 | 0 | 53 | 201 | 231 | 190 | 29 | 3 |
| 70 | 164 | 214 | 174 | 40 | 13 | 67 | 161 | 217 | 177 | 43 | 16 |
| 134 | 104 | 89 | 116 | 143 | 153 | 126 | 99 | 86 | 113 | 140 | 162 |
| 202 | 36 | 9 | 62 | 210 | 234 | 193 | 32 | 6 | 59 | 207 | 243 |
| 189 | 49 | 22 | 76 | 170 | 220 | 180 | 46 | 19 | 73 | 167 | 230 |

FIG.9A

MAIN SCANNING POSITION →

| LIGHT EMITTING ELEMENT POSITION ↔ | | | LIGHT EMITTING ELEMENT POSITION ↔ | | | LIGHT EMITTING ELEMENT POSITION ↔ | | | LIGHT EMITTING ELEMENT POSITION ↔ | | |
|---|---|---|---|---|---|---|---|---|---|---|---|
| 137 | 147 | 120 | 93 | 80 | 107 | 134 | 150 | 123 | 96 | 83 | 110 |
| 204 | 228 | 187 | 26 | 0 | 53 | 201 | 231 | 190 | 29 | 3 | 56 |
| 164 | 214 | 174 | 40 | 13 | 67 | 161 | 217 | 177 | 43 | 16 | 70 |
| 104 | 89 | 116 | 143 | 153 | 126 | 99 | 86 | 113 | 140 | 162 | 134 |
| 36 | 9 | 62 | 210 | 234 | 193 | 32 | 6 | 59 | 207 | 243 | 202 |
| 49 | 22 | 76 | 170 | 220 | 180 | 46 | 19 | 73 | 167 | 230 | 189 |

FIG.9B

MAIN SCANNING POSITION →

| LIGHT EMITTING ELEMENT POSITION ↔ | | | LIGHT EMITTING ELEMENT POSITION ↔ | | | LIGHT EMITTING ELEMENT POSITION ↔ | | | LIGHT EMITTING ELEMENT POSITION ↔ | | |
|---|---|---|---|---|---|---|---|---|---|---|---|
| 137 | 147 | 120 | 93 | 80 | 107 | 134 | 150 | 123 | 96 | 83 | 110 |
| 204 | 228 | 187 | 26 | 0 | 53 | 201 | 231 | 190 | 29 | 3 | 56 |
| 164 | 214 | 174 | 40 | 13 | 67 | 161 | 217 | 177 | 43 | 16 | 70 |
| 104 | 89 | 116 | 143 | 153 | 126 | 99 | 86 | 113 | 140 | 162 | 134 |
| 36 | 9 | 62 | 210 | 234 | 193 | 32 | 6 | 59 | 207 | 243 | 202 |
| 49 | 22 | 76 | 170 | 220 | 180 | 46 | 19 | 73 | 167 | 230 | 189 |

FIG.10A

MAIN SCANNING POSITION →

LIGHT EMITTING ELEMENT POSITION  LIGHT EMITTING ELEMENT POSITION  LIGHT EMITTING ELEMENT POSITION  LIGHT EMITTING ELEMENT POSITION

| 110 | 137 | 147 | 120 | 93  | 80  | 107 | 134 | 150 | 123 | 96  | 83  | 110 |
|-----|-----|-----|-----|-----|-----|-----|-----|-----|-----|-----|-----|-----|
| 56  | 204 | 228 | 187 | 26  | 0   | 53  | 201 | 231 | 190 | 29  | 3   | 56  |
| 70  | 164 | 214 | 174 | 40  | 13  | 67  | 161 | 217 | 177 | 43  | 16  | 70  |
| 134 | 104 | 89  | 116 | 143 | 153 | 126 | 99  | 86  | 113 | 140 | 162 | 134 |
| 202 | 36  | 9   | 62  | 210 | 234 | 193 | 32  | 6   | 59  | 207 | 243 | 202 |
| 189 | 49  | 22  | 76  | 170 | 220 | 180 | 46  | 19  | 73  | 167 | 230 | 189 |

FIG.10B

MAIN SCANNING POSITION →

LIGHT EMITTING ELEMENT POSITION  LIGHT EMITTING ELEMENT POSITION  LIGHT EMITTING ELEMENT POSITION  LIGHT EMITTING ELEMENT POSITION

| 110 | 137 | 147 | 120 | 93  | 80  | 107 | 134 | 150 | 123 | 96  | 83  | 110 |
|-----|-----|-----|-----|-----|-----|-----|-----|-----|-----|-----|-----|-----|
| 56  | 204 | 228 | 187 | 26  | 0   | 53  | 201 | 231 | 190 | 29  | 3   | 56  |
| 70  | 164 | 214 | 174 | 40  | 13  | 67  | 161 | 217 | 177 | 43  | 16  | 70  |
| 134 | 104 | 89  | 116 | 143 | 153 | 126 | 99  | 86  | 113 | 140 | 162 | 134 |
| 202 | 36  | 9   | 62  | 210 | 234 | 193 | 32  | 6   | 59  | 207 | 243 | 202 |
| 189 | 49  | 22  | 76  | 170 | 220 | 180 | 46  | 19  | 73  | 167 | 230 | 189 |

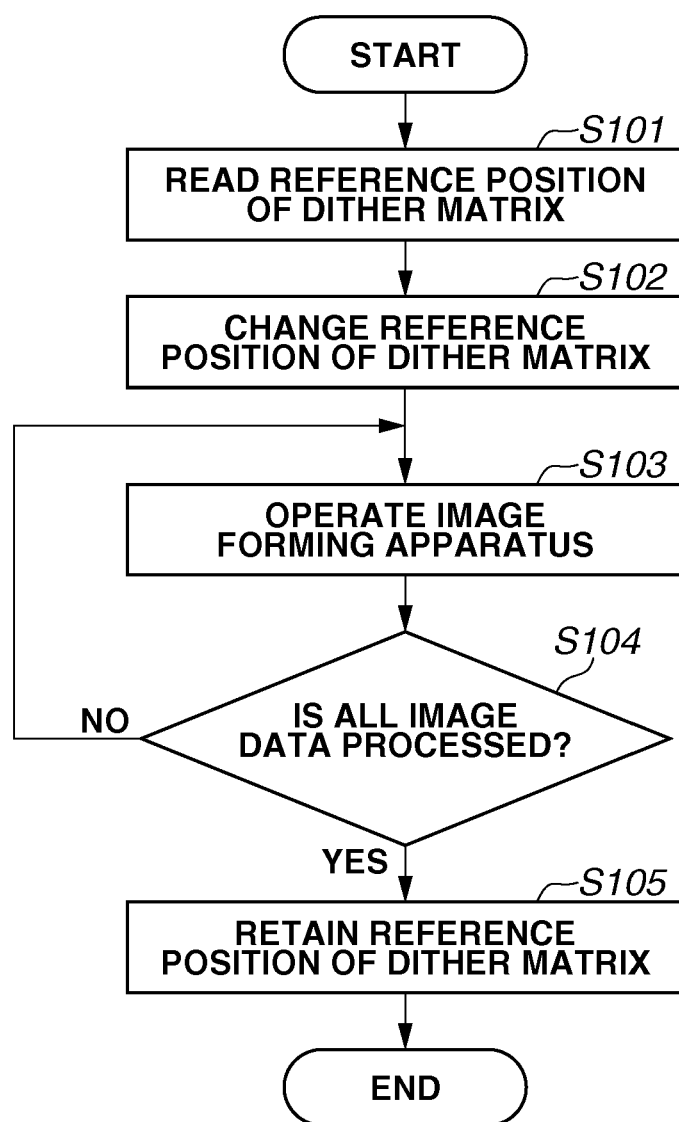

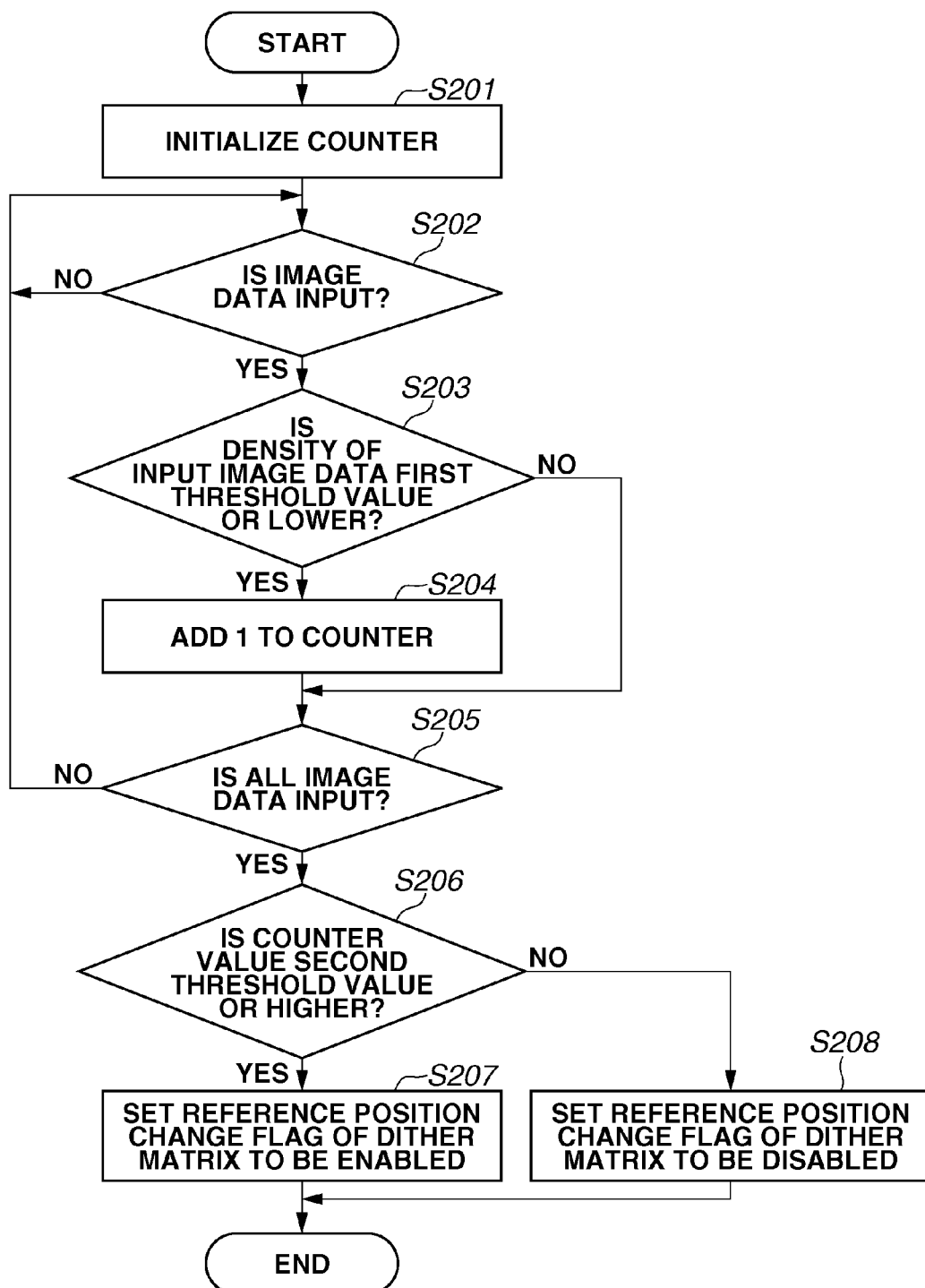

DITHER MATRIX
REFERENCE
POSITION

| 49 | 22 | 76 | 170 | 220 | 180 | 46 | 19 | 73 | 167 | 230 | 189 |
|----|----|----|-----|-----|-----|-----|-----|----|-----|-----|-----|
| 137 | 147 | 120 | 93 | 80 | 107 | 134 | 150 | 123 | 96 | 83 | 110 |
| 204 | 228 | 187 | 26 | 0 | 53 | 201 | 231 | 190 | 29 | 3 | 56 |
| 164 | 214 | 174 | 40 | 13 | 67 | 161 | 217 | 177 | 43 | 16 | 70 |
| 104 | 89 | 116 | 143 | 153 | 126 | 99 | 86 | 113 | 140 | 162 | 134 |
| 36 | 9 | 62 | 210 | 234 | 193 | 32 | 6 | 59 | 207 | 243 | 202 |

FIG.16A

MAIN SCANNING POSITION →

| SECOND-ROW LIGHT EMITTING ELEMENT POSITION ↔ | | | FIRST-ROW LIGHT EMITTING ELEMENT POSITION ↔ | | | SECOND-ROW LIGHT EMITTING ELEMENT POSITION ↔ | | | FIRST-ROW LIGHT EMITTING ELEMENT POSITION ↔ | | | |
|---|---|---|---|---|---|---|---|---|---|---|---|---|
| 49 | 22 | 76 | 170 | 220 | 180 | 46 | 19 | 73 | 167 | 230 | 189 | ⇐ FIRST ROW |
| 137 | 147 | 120 | 93 | 80 | 107 | 134 | 150 | 123 | 96 | 83 | 110 | ⇐ SECOND ROW |
| 204 | 228 | 187 | 26 | 0 | 53 | 201 | 231 | 190 | 29 | 3 | 56 | ⇐ FIRST ROW |
| 164 | 214 | 174 | 40 | 13 | 67 | 161 | 217 | 177 | 43 | 16 | 70 | ⇐ SECOND ROW |
| 104 | 89 | 116 | 143 | 153 | 126 | 99 | 86 | 113 | 140 | 162 | 134 | ⇐ FIRST ROW |
| 36 | 9 | 62 | 210 | 234 | 193 | 32 | 6 | 59 | 207 | 243 | 202 | ⇐ SECOND ROW |

FIG.16B

MAIN SCANNING POSITION →

| LIGHT EMITTING ELEMENT POSITION ↔ | | | LIGHT EMITTING ELEMENT POSITION ↔ | | | LIGHT EMITTING ELEMENT POSITION ↔ | | | LIGHT EMITTING ELEMENT POSITION ↔ | | | |
|---|---|---|---|---|---|---|---|---|---|---|---|---|
| 49 | 22 | 76 | 170 | 220 | 180 | 46 | 19 | 73 | 167 | 230 | 189 | ⇐ FIRST ROW |
| 137 | 147 | 120 | 93 | 80 | 107 | 134 | 150 | 123 | 96 | 83 | 110 | ⇐ SECOND ROW |
| 204 | 228 | 187 | 26 | 0 | 53 | 201 | 231 | 190 | 29 | 3 | 56 | ⇐ FIRST ROW |
| 164 | 214 | 174 | 40 | 13 | 67 | 161 | 217 | 177 | 43 | 16 | 70 | ⇐ SECOND ROW |
| 104 | 89 | 116 | 143 | 153 | 126 | 99 | 86 | 113 | 140 | 162 | 134 | ⇐ FIRST ROW |
| 36 | 9 | 62 | 210 | 234 | 193 | 32 | 6 | 59 | 207 | 243 | 202 | ⇐ SECOND ROW |

METHOD FOR PERFORMING DITHER PROCESSING

BACKGROUND OF THE INVENTION

1. Field of the Invention

The present invention relates to dither processing.

2. Description of the Related Art

In an electrophotographic printer, a method for forming a latent image on a photosensitive drum by using an exposure head is generally known. The exposure head with a light emitting diode (LED) or an organic electroluminescent (EL) irradiates the photosensitive drum with light to form the latent image. The exposure head includes a light emitting element group arranged in a longitudinal direction of the photosensitive drum, and a rod lens array for forming an image on the photosensitive drum with the light of the light emitting element group. Herein, a length of the light emitting element group is determined according to a width of an image region on the photosensitive drum, and a distance between pixels is determined according to resolution of the printer. The photosensitive drum corresponding to A3 size as an image region width has a length of approximately 310 mm, and the light emitting element group includes approximately 15,000 light emitting elements when a resolution is 1,200 dots per inch (dpi) (the approximate number of 15,000 is calculated by (310×1,200÷25.4)). In this case, a distance between the light emitting elements, that is, a distance between pixels is 21.2 μm (digits after the second decimal place are omitted).

A printer employing such an exposure head uses fewer components than a laser scanning-type printer which performs polarization scanning of laser beams by a polygonal mirror drive motor. Accordingly, with the fewer number of components, size and costs of the printer employing the exposure head are readily reduced. However, the light emitting element such as an LED and an organic EL has a characteristic in which an amount of light decreases over time. Especially, a light amount of the organic EL decreases faster. In a case where frequency of use of each light emitting element differs, deterioration progress of each element varies, causing variation in the light amount. Consequently, a poor-quality image such as an image having streaks is generated.

Japanese Patent Application Laid-Open No. 2008-87196 discusses an arrangement of a light emitting element group and an addition of a dummy pixel to the top of image data to deal with such a problem. The light emitting element group is arranged to have a length that exceeds a width of an image region as a printing target. The dummy pixel is added to the top of image data when a different page is printed. Such an addition of the dummy pixel to the top of image data changes allocation of effective light emitting elements. This prevents lighting unevenness in a pixel position in a main scanning direction even if image data of the printing target is the same.

However, according to the method discussed in Japanese Patent Application Laid-Open No. 2008-87196, for example, allocation of the light emitting elements to be used is changed for each page. Although such a change in the allocation reduces a load of the light emitting element during continuous lighting, positional deviation occurs every page due to the addition of the dummy pixel.

This type of issue may occur not only in the light emitting elements such as an LED and an organic EL, but also in a printing apparatus including one or a plurality of elements per pixel like an ink discharge element for inkjet printing.

However, the printing apparatus is not the only apparatus which is to solve this issue. In the present specification, an element such as a light emitting element and an ink discharge element used for printing is called a printing element.

For example, it may be preferable for a host computer, in which an application (e.g., PHOTOSHOP®) capable of performing dither processing is installed, to take countermeasures to cope with such an issue although the host computer does not necessarily execute a printing operation, because a dither processing result acquired by such application is often transmitted to the printing apparatus including such printing element.

SUMMARY OF THE INVENTION

According to an aspect of the present invention, a method includes applying a predetermined dither matrix including a plurality of threshold values to first image data, printing a result of the application on a first sheet, applying the predetermined dither matrix to second image data, and printing a result of the application on a second sheet, wherein the threshold value to be applied to a pixel in a predetermined position in the second image data differs from the threshold value to be applied to a pixel in the predetermined position in the first image data.

Further features of the present invention will become apparent from the following description of exemplary embodiments with reference to the attached drawings.

BRIEF DESCRIPTION OF THE DRAWINGS

FIG. 6 is a diagram illustrating a dither matrix.

FIG. 8A is a diagram illustrating a dither matrix according to the first exemplary embodiment, and FIG. 8B is a diagram illustrating a dither matrix in which a phase is shifted according to the first exemplary embodiment.

FIG. 9A is a diagram illustrating a relationship among print image data, dither matrix coefficients the phase of which is shifted, and light emitting element positions, and FIG. 9B is a diagram illustrating print image data having a higher density than that illustrated in FIG. 9A, dither matrix coefficients the phase of which is shifted, and light emitting element positions.

FIG. 10A is a diagram illustrating a relationship among print image data, dither matrix coefficients the phase of which is further shifted, and light emitting element positions, and FIG. 10B is a diagram illustrating print image data having a higher density than that illustrated in FIG. 10A, dither matrix coefficients the phase of which is further shifted, and light emitting element positions.

FIG. 11 is a flowchart illustrating processing performed by a central processing unit (CPU) according to the first exemplary embodiment.

FIG. 12 is a flowchart illustrating processing performed by an image forming unit according to a second exemplary embodiment.

FIG. 16A is a diagram illustrating a position of an element that emits light according to the third exemplary embodiment, and FIG. 16B is a diagram illustrating a position of an element that emits light according to the third exemplary embodiment where a density is higher than that illustrated in FIG. 16A.

DESCRIPTION OF THE EMBODIMENTS

Various exemplary embodiments, features, and aspects of the invention will be described in detail below with reference to the drawings.

One of exemplary embodiments of the present invention is now described by using an image forming apparatus. In the present exemplary embodiment, the image forming apparatus causes an exposure head including organic EL elements arranged on a substrate to expose. Moreover, light emission frequency of the organic EL element (hereinafter called a light emitting element) is approximately averaged by changing a reference position of a dither matrix with respect to each page or each job, the dither matrix being used when an image is formed. Hereinafter, the present exemplary embodiment is described in detail. In the present exemplary embodiment, the image forming apparatus including the organic EL element is described. However, the present exemplary embodiment can be applied to an image forming apparatus including an element such as an LED element or an inkjet element having one element or a plurality of elements per pixel, in addition to the organic EL.

[Entire Configuration of Image Forming Apparatus]

Figure 1:
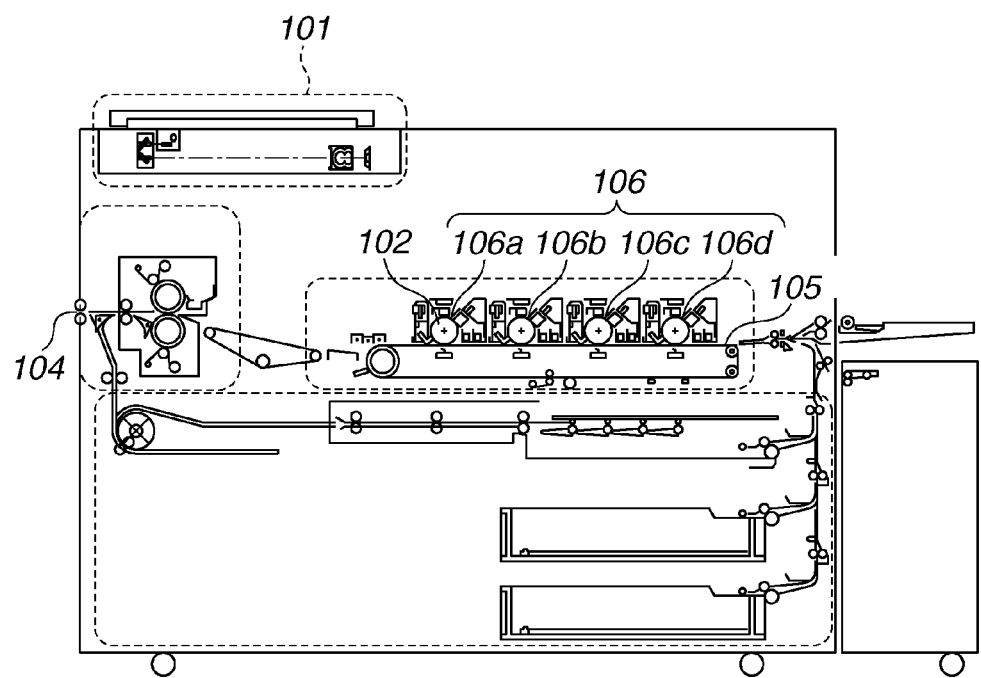
FIG. 1 is an overall view illustrating an image forming apparatus.

An electrophotographic image forming apparatus according to the present exemplary embodiment is briefly described with reference to FIG. 1 which illustrates an entire configuration of the image forming apparatus. The image forming apparatus includes a scanner unit 101, an exposure head 106 (106a, 106b, 106c, and 106d), a photosensitive drum 102, a fixing unit 104, an intermediate transfer member 105, and each unit illustrated in FIG. 4. The scanner unit 101 optically reads (scans) a document image of an original document placed on a document positioning plate by applying light, and generates image data by converting the read image into an electric signal. Upon generation of the image data, the scanner unit 101 inputs the image data in a data input unit 404 illustrated in FIG. 4, and notifies a control unit which will be described below of completion of the scanning. Subsequently, the image data undergoes various processing that will be described with reference to FIG. 4, and the resultant image data (a dither processing result) is transmitted as an electric signal to the exposure head 106. The exposure head 106 emits light according to the image data (the dither processing result), and the emitted light is collected by a rod lens array to the photosensitive drum 102. The exposure head 106 will be described in detail below. The photosensitive drum 102 is charged by a charging device (not illustrated) before the light is collected by the exposure head 106. The image data (the dither processing result) is formed as a latent image on the photosensitive drum 102 that is rotated with the light collected by the rod lens array. The latent image formed on the photosensitive drum 102 is developed with toner, and the toner image is transferred to the intermediate transfer member 105. Then, the toner image on the intermediate transfer member 105 is transferred to a sheet of printing paper fed by a feeding unit (not illustrated). The fixing unit 104 includes a combination of a roller and a belt. The fixing unit 104 fuses and fixes the toner image transferred to the printing paper with heat and pressure. The printing paper with the fixed toner image is output through a conveyance unit (not illustrated), and the image forming apparatus completes the printing operation.

[Configuration of Exposure Head]

Figure 2A:
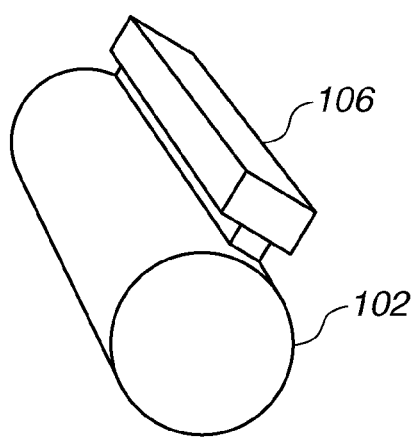
FIG. 2A is a diagram illustrating a positional relationship between an exposure head and a photosensitive drum.
Figure 2B:
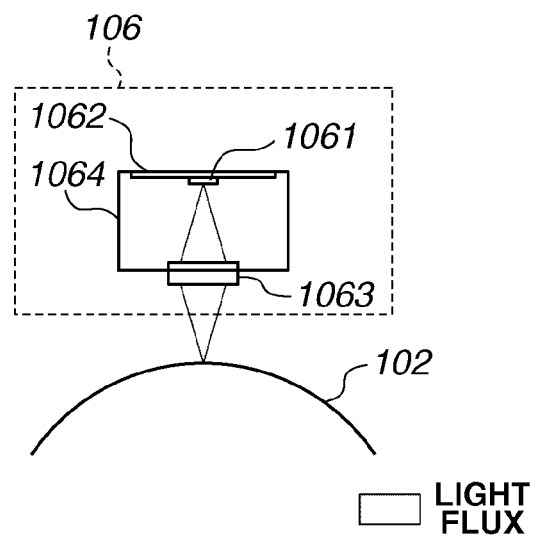
FIG. 2B is a cross-sectional view illustrating the positional relationship illustrated in FIG. 2A.

In the present exemplary embodiment, the exposure head 106 irradiates the photosensitive drum 102 with light. FIG. 2A is a diagram illustrating a positional relationship between the exposure head 106 and the photosensitive drum 102 in the image forming apparatus. FIG. 2B is a cross-sectional view illustrating a middle position of FIG. 2A in a state that the light emitted from a light emitting element included in the exposure head 106 is collected with respect to the photosensitive drum 102. Each of the exposure head 106 and the photosensitive drum 102 is mounted to the image forming apparatus by a mounting member (not illustrated).

In FIG. 2B, the exposure head 106 includes a light emitting element group 1061, a printed circuit board 1062 on which the light emitting element group 1061 is arranged, a rod lens array 1063, and a housing 1064 on which the rod lens array 1063 and the printed circuit board 1062 are mounted. The housing 1064 fixes the printed circuit board 1062 and the rod lens array 1063 to the image forming apparatus, and is mounted on a member for supporting the photosensitive drum 102. Herein, a distance between the photosensitive drum 102 and the rod lens array 1063 is arranged to be the same as that between the rod lens array 1063 and the light emitting element group 1061, so that an image is formed on the photosensitive drum 102 with the light of the light emitting element group 1061. Although the light emitting element group 1061 is described, only one of light emitting elements in the light emitting element group 1061 is illustrated in FIG. 2.

Figure 3:
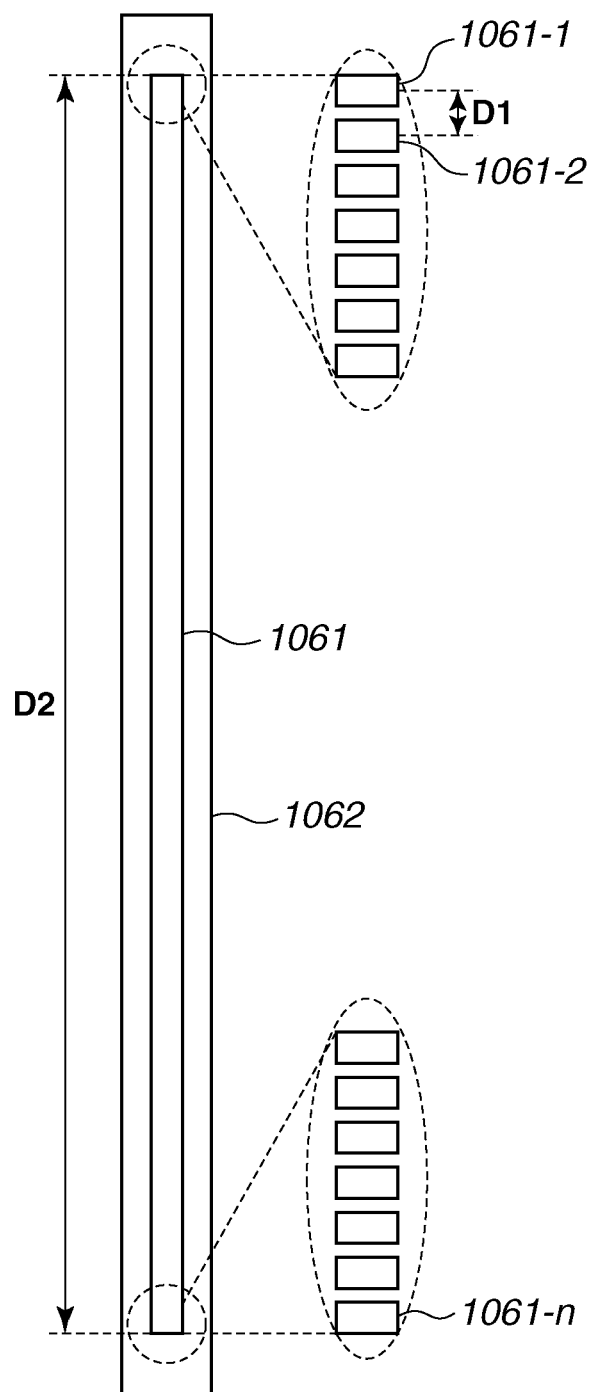
FIG. 3 is a diagram illustrating an arrangement of a substrate and light emitting elements inside the exposure head.

FIG. 3 is a diagram illustrating the printed circuit board 1062 on which the light emitting element group 1061 is arranged, as seen from the photosensitive drum 102 (the rod lens array 1063 and the housing 1064 are excluded in this diagram). In FIG. 3, components similar to those described in FIG. 2 are given the same reference numerals. In FIG. 3, light emitting elements in the light emitting element group 1061 are arranged in a longitudinal direction (hereinafter called a main scanning direction) of the photosensitive drum 102 with an equal distance therebetween. Each of light emitting elements 1061-1 through 1061-$n$ of the light emitting element group 1061 is arranged as illustrated in enlarged partial views within FIG. 3. If a resolution in the main scanning direction is 1,200 dpi, a distance between pixels is approximately 21.1 μm. Therefore, a distance D1 between the light emitting element 1061-1 and the light emitting element 1061-2 is approximately 21.1 μm. The exposure head 106 has a printing width that is determined according to sheet size as a printing target of the image forming apparatus. For example, in an image forming apparatus dealing with A3 size with 1,200 dpi, a reference letter "n" corresponds to approximately 15,000 pixels, and thus approximately 15,000 light emitting elements are arranged on the printed circuit board 1062. In the present exemplary embodiment, the reference letter "n" represents the number of light emitting elements corresponding to the printing width to be dealt by the image forming apparatus. The number of light emitting elements is not excessive relative to the printing width.

[Configuration of Control Unit of Image Forming Apparatus (Printing Apparatus)]

Figure 4:
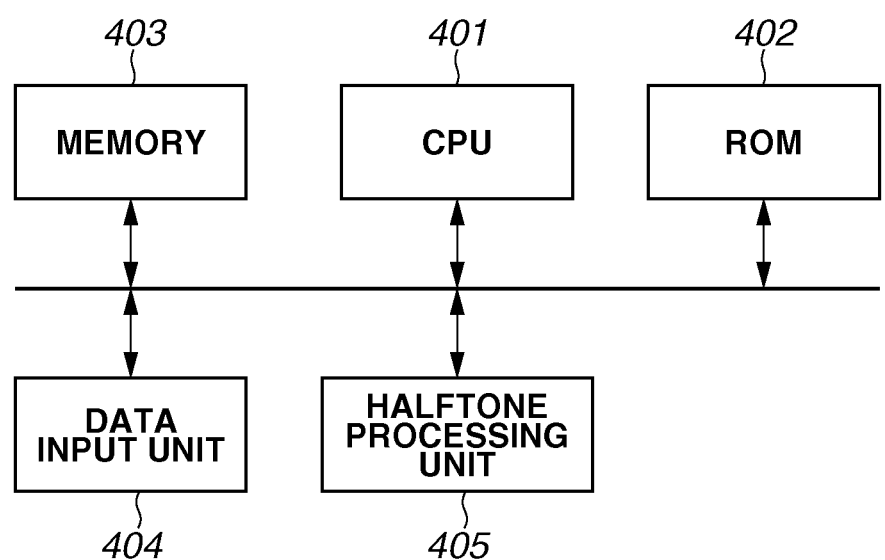
FIG. 4 is a block diagram illustrating components in the image forming apparatus according to a first exemplary embodiment.

The image forming apparatus in the present exemplary embodiment includes a control unit and a halftone processing unit. A configuration of the image forming apparatus including these units is described with reference to a block diagram illustrated in FIG. 4. In FIG. 4, components similar to those described above in the other diagrams are given the same reference numerals. A CPU 401 comprehensively controls the image forming apparatus. A read only memory (ROM) 402 stores a control program to be executed by the CPU 401. A memory 403 temporarily stores image data processed by the CPU 401 or each processing unit which will be described below. In the present exemplary embodiment, the control unit of the image forming apparatus includes the CPU 401, the ROM 402, and the memory 403.

The data input unit 404 receives image data read by the scanner unit 101. The data input unit 404 can also receive image data input from a personal computer (PC). The data input unit 404 includes a function of converting input image data into density data. This function enables conversion of the input image data (generally, 8-bit luminance data for each of red, green and blue (RGB)) into cyan, magenta, yellow, and black (C, M, Y, and K) density data (8-bit density data for each of C, M, Y, and K).

A halftone processing unit 405 executes halftone processing on the density data input through the data input unit 404. A halftone processing result includes a processing result (1 or 0) for each pixel.

Figure 5:
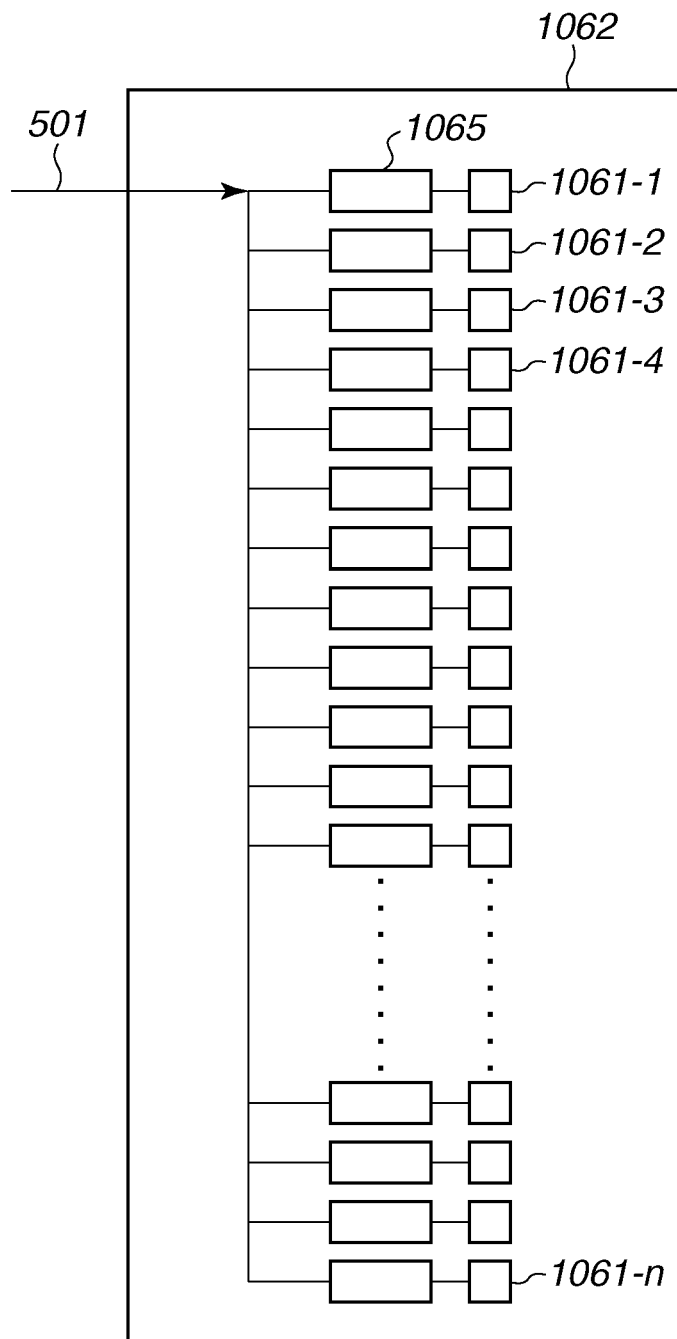
FIG. 5 is a diagram illustrating an internal configuration of the exposure head.

The halftone processing executed by the halftone processing unit 405 includes dither processing. The halftone processing result is transmitted to a drive unit 1065, which is illustrated in FIG. 5, in an electric signal form. A control operation performed when the dither processing is performed will be described in detail below.

Each of the data input unit 404 and the halftone processing unit 405 includes hardware. The dither processing result is transmitted as an electric signal to the exposure head 106.

[Relationship Between Image Data and Light Emitting Element Group, and Lighting Control]

FIG. 5 is a block diagram illustrating a relationship between a halftone processing result and the light emitting element group 1061 arranged in the exposure head 106. On the printed circuit board 1062, the light emitting element group 1061 (including individual light emitting elements 1061-1 through 1061-n) and the drive units 1065 for individually driving the respective light emitting elements are mounted. The drive unit 1065 receives the image data (the halftone processing result) generated by the halftone processing unit 405 through a channel 501. Herein, the image data is transferred as an electric signal to the drive unit 1065. For example, if halftone processing results across entire line extending in a main scanning direction are 1, the drive units 1065 control all the connected light emitting elements such that each of these light emitting elements lights. If only first two pixels in the halftone processing results are 1 while the other pixels are 0, the drive units 1065 control the light emitting elements 1061-1 and 1061-2 such that only these two light emitting elements light. Accordingly, the exposure head 106 causes only a light emitting element in a position corresponding to a pixel which is 1 in the halftone processing result to emit light based on the input image data (the halftone processing result), the position being in a main scanning direction.

[Dither Processing]

Now, dither processing according to the present exemplary embodiment is described. FIG. 6 is a diagram illustrating a dither matrix of black (K) among color image data to be formed. In the present exemplary embodiment, a dither matrix of a single color is described. However, the present exemplary embodiment is similarly applied to the other colors which are cyan, magenta, and yellow. Although FIG. 6 illustrates the dither matrix (a coefficient arrangement, that is, a threshold value arrangement) to be used in the dither processing in the present exemplary embodiment, another dither matrix may be used. In FIG. 6, a thick line is used for the sake of convenience, but can be disregarded. This dither matrix is used when 73 gradations (6×12+1=73) are expressed. However, a dither matrix capable of expressing 256 gradations may be desirable.

Figure 7A:
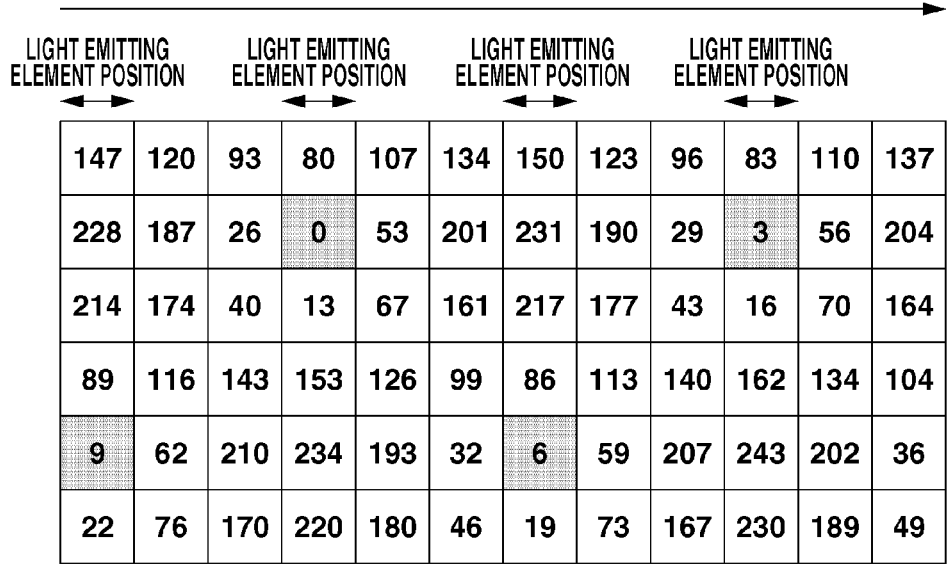
FIG. 7A is a diagram illustrating a relationship among print image data, dither matrix coefficients, and light emitting element positions.
Figure 7B:
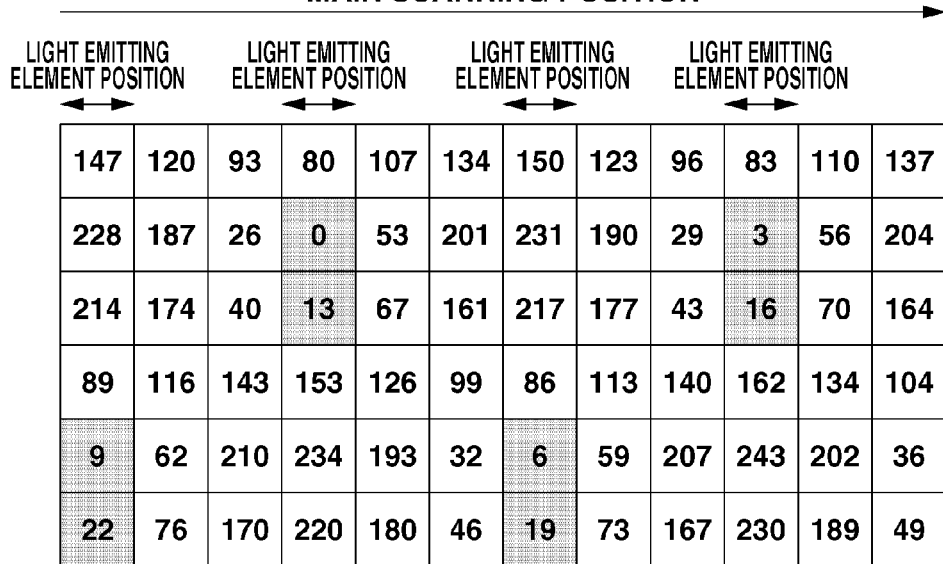
FIG. 7B is a diagram illustrating a relationship among print image data having a higher density than that illustrated in FIG. 7A, dither matrix coefficients, and light emitting element positions.

In the dither processing, a dither matrix (i.e., each of coefficients) and image data (i.e., density data of each pixel) input through the data input unit 404 are compared, and the image data is converted into an N-value. In the present exemplary embodiment, N is described as 2 (0 or 1 is output as a result). Particularly, if density data (the smaller the value thereof, the brighter the portion) input from the data input unit 404 is below a dither matrix coefficient in a position corresponding to the pixel with this density data, the halftone processing unit 405 outputs 0 (a light emitting element should not light). In other cases, the halftone processing unit 405 outputs 1 (a light emitting element should light). FIGS. 7A and 7B illustrate results of the dither processing performed on the density data input from the data input unit 404. FIG. 7A illustrates the dither processing result, where the density data input from the data input unit 404 is uniformly 13 (approximately 5% of range: highlight). In FIG. 7A, a shaded area indicates a location in which a dither matrix coefficient becomes 1 as a result of the dither processing. As illustrated in FIG. 7A, in 12 pixels×6 pixels as a unit, there are four locations (positions of dither matrix coefficients of 0, 3, 6 and 9) in which 1 is output in comparison with the dither matrix coefficients illustrated in FIG. 6. Consequently, in this case, in 12 pixels as a unit among the light emitting element group in the main scanning direction, the light emitting elements positioned corresponding to a first pixel, a fourth pixel, a seventh pixel, and a tenth pixel emit light. According to the dither processing, first, the dither matrix is applied to a pixel group of 12 pixels in the main scanning direction×6 pixels in the sub-scanning direction, the pixel group including a top-left pixel (i.e., a first pixel in both of the main scanning direction and the sub-scanning direction) in the image data. Next, the same dither matrix is applied to a pixel group of 12 pixels×6 pixels including a thirteenth pixel from the left in the top line (i.e., a thirteenth pixel in the main scanning direction, a first pixel in the sub-scanning direction). Accordingly, the dither matrix is applied to the image data with a cycle of 6 pixels in height and 12 pixels in width, so that light emitting elements of lighting targets are cyclically determined. For example, the target light emitting elements are determined to be a thirteenth pixel, a sixteenth pixel, a nineteenth pixel, and so on in the main scanning direction as seen from the top-left pixel. That is, the light emitting elements positioned every three pixels from a first pixel light. FIG. 7B illustrates a dither processing result where the image data input from the data input unit 404 is uniformly 26 (approximately 10% of range: highlight). As illustrated in FIG. 7B, in 12 pixels×6 pixels as a unit, there are eight locations (positions of dither matrix coefficients of 0, 3, 6, 9, 13, 16, 19, and 22) in which 1 is output in comparison with the dither matrix coefficients illustrated in FIG. 6. In this case, therefore, in 12 pixels as a unit among the light emitting element group in the main scanning direction, the light emitting elements positioned corresponding to pixels in every three pixels from a first pixel emit light.

[Change of Dither Matrix]

According to FIGS. 7A and 7B, in a case where the input image data includes a low-density portion (a highlight portion), the dither processing result in the same position in the main scanning direction becomes 1 in units of dither matrix size. The dither processing result is linked to a lighting control operation performed by the drive unit 1065 on the printed circuit board 1062 in the exposure head 106. Thus, in a case where image data to be printed by the image forming apparatus is a uniformly low-density portion (a highlight portion), the light emitting element to light is in the same position. In an office, image data to be printed often includes a high-density character on a low-density portion (a highlight portion) as a background. Thus, the image data with such low density is often generated. Therefore, the frequency of lighting of the light emitting element in the same position in the main scanning direction significantly increases during a printing operation. The light emitting element to light has lighting unevenness. This lighting unevenness not only shortens a lifespan of the light emitting element, but also causes deterioration in image quality of print image data due to changes in an amount of light even before the light emitting element fails. In the present exemplary embodiment, therefore, a reference position of the dither matrix to be used in the dither processing is shifted by a predetermined amount in the main scanning direction. Such shift processing is described in detail below.

FIG. 8A is a diagram illustrating a dither matrix in which a phase is shifted by one pixel relative to the dither matrix illustrated in FIG. 6. If a position having a dither matrix coefficient of 147 is a reference position, this reference position is shifted by one pixel in the main scanning direction (in a rightward direction) relative to the diagram illustrated in FIG. 6. Since the reference position is shifted by one pixel, dither matrix coefficients on the rightmost side in FIG. 6 are positioned on the leftmost side in FIG. 8A. With such a structure of the dither matrix, a result of the dither processing performed on the image data which is uniformly 13 (approximately 5% of range: highlight) is illustrated in FIG. 9A. Similarly, FIG. 9B is a diagram illustrating a result of the dither processing performed on the image data which is uniformly 26 (approximately 10% of range: highlight). Since the reference position of the dither matrix to be applied is shifted by one pixel, positions of the light emitting elements illustrated in FIGS. 9A and 9B are shifted by one pixel in the direction in which the reference position is shifted. The light emitting element positions illustrated in FIGS. 9A and 9B are shifted by one pixel in comparison with those illustrated in FIGS. 7A and 7B, respectively.

FIG. 8B is a diagram illustrating a dither matrix in which a cycle is shifted by two pixels in the main scanning direction (in the right direction) relative to that illustrated in FIG. 6. Since the reference position is shifted by two pixels, dither matrix coefficients in two columns on the right side in FIG. 6 are positioned in two columns on the left side in FIG. 8B. With such a structure of the dither matrix, a result of the dither processing performed on the image data which is uniformly 13 (approximately 5% of range: highlight) is illustrated in FIG. 10A. Similarly, FIG. 10B is a diagram illustrating a result of the dither processing performed on the image data which is uniformly 26 (approximately 10% of range: highlight). Since the reference position of the dither matrix to be applied is shifted by two pixels, positions of the light emitting elements illustrated in FIGS. 10A and 10B are shifted by two pixels relative to the respective diagrams illustrated in FIGS. 7A and 7B.

That is, if image data having a lot of low-density portions (i.e., highlight portions) is sequentially printed, a phase of the dither matrix to be used in the dither processing by the halftone processing unit 405 is shifted. Such a shift of the phase can change positions of light emitting elements to light, the light emitting elements being arranged on the printed circuit board 1062 in the exposure head 106. The control unit controls a change of a position of the light emitting element to light. Hereinafter, such control processing by the control unit is described with reference to FIG. 11. FIG. 11 is a flowchart illustrating the control processing performed by the control unit when a reference position of the dither matrix to be used in the dither processing by the halftone processing unit 405 is changed.

In step S101, upon receipt of a scan completion notification, the control unit reads a dither matrix applied in preceding dither processing by the halftone processing unit 405. Herein, the dither matrix applied in the preceding dither processing is retained inside the control unit. In a case where the image forming apparatus is in an initial state, a dither matrix retained inside the control unit is applied. In such a case, the dither matrix should have a reference position which has not been shifted.

In step S102, the control unit changes a phase of coefficients within the read dither matrix to a horizontal direction (a main scanning direction), and sets the changed dither matrix in the halftone processing unit 405. In step S102, any processing may be performed as long as the reference position (a threshold value position of 147) within the dither matrix can be changed. For example, a reference position of the dither matrix may be shifted to the right side by K (K is to be 1 or greater, and to be a value of "the length of the dither matrix−1" or smaller. In this example, K is 1 or greater and 11 or smaller). Alternatively, random numbers in a range between 1 or great and 11 or smaller may be generated, and a reference position of the dither matrix may be shifted to the right side by the generated random number. In any of these cases, each of the light emitting elements 1061-1 through 1061-*n* arranged on the printed circuit board 1062 can avoid continuous lighting as much as possible. That is, a calculation for changing the light emitting elements to light is performed based on consideration of the dither matrix coefficients to be applied in the dither processing and the value of the image data of the low-density portions (highlight portions). Accordingly, the control processing by the control unit in step S102 is executed on a print page basis or a job basis in the image forming apparatus. When the reference position of the dither matrix is shifted to the right by K, coefficients in a K column are positioned outside the dither matrix on the right side. However, these coefficients are retained on the left side of the dither matrix. Consequently, even if such a shift is made, size of a pre-shift dither matrix and size of a post-shift dither matrix are the same (size represents the number of coefficients. In this example, the size is 12×6=72). Moreover, coefficients included in each of the dither matrixes are the same.

Accordingly, the reference position of the dither matrix is set in step S102. Subsequently, in step S103, the control unit operates the image forming apparatus as follows. Particularly, the control unit causes the image data input from the data input unit 404 to be stored inside thereof. Then, the control unit transfers the image data stored thereinside to the halftone processing unit 405, and the halftone processing unit 405 applies the set dither matrix to the image data transferred based on the control made by the control unit. When finishing the dither processing, the halftone processing unit 405 notifies the control unit accordingly. Subsequently, the control unit makes the halftone processing unit 405 transfer the generated image data (a halftone processing result) to the exposure head 106 as an electric signal.

In step S104, the control unit repeats the processing of step S103 until all image data input from the data input unit 404 is processed. If the control unit confirms that all the image data input from the data input unit 404 has undergone the dither processing performed by the halftone processing unit 405 (YES in step S104), the operation proceeds to step S105. In step S105, the control unit retains thereinside the reference position of the dither matrix applied in the dither processing performed by the halftone processing unit 405. The image data exposed by the exposure head 106 is formed as a latent image on the photosensitive drum 102. Then, toner adheres to the latent image formed on the photosensitive drum 102, thereby developing the latent image. The developed image data is transferred to the intermediate transfer member 105, and the transferred image data is fixed by the fixing unit 104 to a sheet of printing paper conveyed by a conveyance unit. Then, the resultant sheet is output as a printed product from the image forming apparatus.

According to the first exemplary embodiment of the present invention, therefore, when the image forming apparatus executes a printing operation, a phase of the coefficients within the dither matrix to be applied in the dither processing is shifted in the main scanning direction. Such a shift of the phase can reduce the frequency of continuous lighting of the light emitting element when the image data including a low-density portion (a highlight portion) is printed. Moreover, the dither matrix is changed for each page, so that the frequency of continuous lighting of the same light emitting element can be reduced even when the same image data is continuously printed.

In the present exemplary embodiment, the phase of the coefficients within in the dither matrix is shifted, so that a new dither matrix is generated and applied to the image data. However, the present exemplary embodiment is not limited thereto. For example, coefficients within the dither matrix may remain unchanged (i.e., the dither matrix is not changed), while a phase at the time of application of the dither matrix may be shifted. In other words, coefficients of six pixels from the rightmost side within the dither matrix of 12 pixels×6 pixels are applied to a line having a total of six pixels including a top-left pixel, instead of applying a dither matrix to 12 pixels×6 pixels the arrangement of which starts from the top-left pixel. Then, the dither matrix may be applied to 12 pixels×6 pixels the arrangement of which starts from the pixel that is a second pixel from the left and arranged at the top.

Moreover, the processing in step S101 and step S102 may be executed for each job, instead of each page. That is, in case of the same job (e.g., in a case where 10 sheets are sequentially scanned while two copies of printing is set, a printing operation for 20 sheets is considered as the same job), a dither matrix may be applied using the same phase (or a dither matrix having the same phase is applied). In a case where a different job starts, a phase of the dither matrix (or a phase to which the dither matrix is applied) may be shifted.

In the first exemplary embodiment, when the image forming apparatus executes a printing operation, a reference position of a dither matrix is shifted on a page basis or a job basis. However, in a case where the image forming apparatus prints image data having few low-density portions (highlight portions), each of the light emitting elements 1061-1 through 1061-n arranged on the printed circuit board 1062 does not light in a fixed state based on the image data. That is, after such image data is printed, the control unit does not need to change the reference position of the dither matrix. Hereinafter, operations of the halftone processing unit 405 and the control unit in such a case are described as a second exemplary embodiment.

[Operation Flow of Halftone Processing Unit]

FIG. 12 is a flowchart illustrating operations performed by the halftone processing unit 405 according to the second exemplary embodiment. The halftone processing unit 405 executes dither processing on image data input through the data input unit 404, based on the control by the control unit. In step S201, the halftone processing unit 405 initializes a counter (not illustrated) disposed thereinside before executing the dither processing. In step S202, the halftone processing unit 405 determines whether image data is input. If the image data is input (YES in step S202), then in step S203, the halftone processing unit 405 checks whether a density of the input image data is a first threshold value or lower. This first threshold value is set by the control unit, and used to determine a density of the image data to be input from the data input unit 404. If the image data is not input (NO in step S202), the halftone processing unit 405 waits until the image data is input without executing the dither processing. If the input image data is the first threshold value or lower, that is, the image data is low-density (highlight) pixel data (YES in step S203), the operation proceeds to step S204. In step S204, the halftone processing unit 405 adds 1 to the counter. If the input image data exceeds the first threshold value (NO in step S203), the halftone processing unit 405 waits for next image data without executing addition processing with respect to the counter. In the present exemplary embodiment, the halftone processing unit 405 adds 1 pixel as a unit to the counter. However, the present exemplary embodiment is not limited thereto. That is, the halftone processing unit 405 may perform addition processing when a plurality of successive pixels is the first threshold value or lower. The halftone processing unit 405 may perform addition processing using a predetermined region in a main scanning direction or a sub-scanning direction as a unit.

In step S205, the halftone processing unit 405 determines whether all the image data from the data input unit 404 is input. If all of the image data from the data input unit 404 is not input (NO in step S205), the halftone processing unit 405 repeats the processing from step S202 to step S204 until all the image data from the data input unit 404 is input. If the halftone processing unit 405 finishes first threshold value comparison processing on all the image data from the data input unit 404 (YES in step S205), the operation proceeds to step S206. In step S206, the halftone processing unit 405 compares the counter value retained at this point with a predetermined second threshold value. The second threshold value is set by the control unit, and used to determine how much low-density image data is included in 1-page image data input from the data input unit 404. If the retained counter value is greater than the second threshold value (YES in step S206), the halftone processing unit 405 determines that the image data input from the data input unit 404 includes a lot of low-density (highlight) pixels. Subsequently, in step S207, the halftone processing unit 405 sets a reference position change flag (not illustrated) of the dither matrix to be enabled. The reference position change flag is retained inside the halftone processing unit 405. If the retained counter value is smaller than the second threshold value (NO in step S206), the halftone processing unit 405 determines that the image data input from the data input unit 404 includes few low-density (highlight) pixels. Subsequently, in step S208, the halftone processing unit 405 sets the reference position change flag of the dither matrix to be disabled.

[Control Flow of Control Unit]

Figure 13:
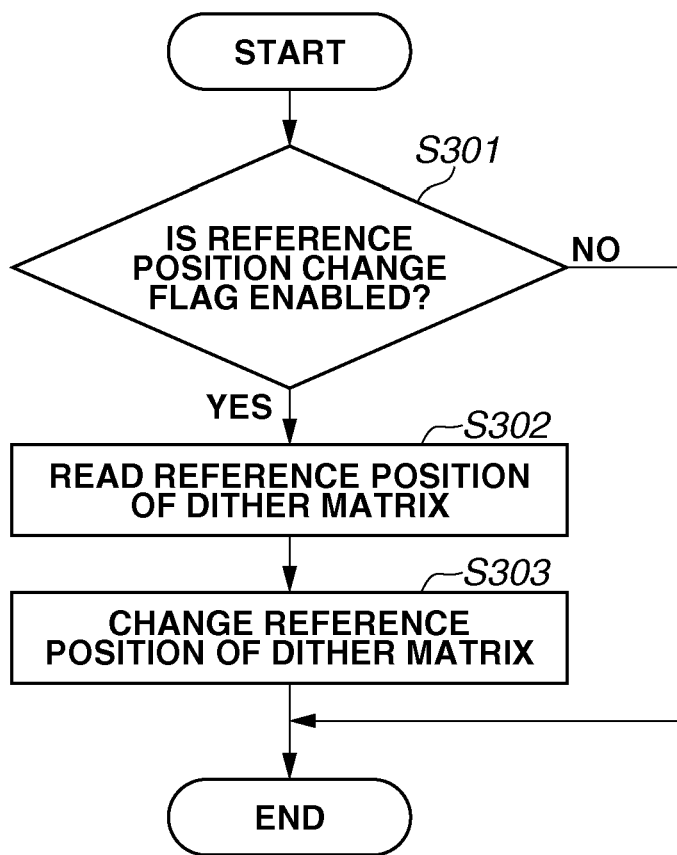
FIG. 13 is a flowchart illustrating processing performed by a CPU according to the second exemplary embodiment.

A description is given of control processing performed by the control unit when the halftone processing unit 405 executes the processing based on FIG. 12. FIG. 13 is a flowchart illustrating the control processing performed by the control unit according to the second exemplary embodiment. In step S301, the control unit checks a state of the reference position change flag retained in the halftone processing unit 405 before starting the control processing for the dither processing on the image data input from the data input unit 404. If the reference position change flag of the dither matrix is enabled (YES in step S301), the control unit determines that the image data processed by preceding processing includes a lot of low-density (highlight) pixels. In step S302, the control unit reads a dither matrix reference position retained in the memory 403 as similar to the control processing in the first exemplary embodiment. In step S303, the control unit sets a different dither matrix reference position for the halftone processing unit 405 so that continuous lighting of the light emitting element is reduced. Herein, the dither matrix reference position set by the control unit is different from the retained reference position. If the dither matrix reference position change flag retained in the halftone processing unit 405 is disabled (NO in step S301), the control unit determines that the image data processed by preceding processing does not include a lot of low-density (highlight) pixels. In this case, the control unit determines that a lighting position of the light emitting element group 1061 on the printed circuit board 1062 is not fixed, and executes control processing such that the reference position of the dither matrix with respect to the halftone processing unit 405 is not changed.

According to the second exemplary embodiment, therefore, the control unit can control whether to change the reference position of the dither matrix according to a state of the preceding image data. Thus, after the image forming apparatus prints the image data by which a position of a light emitting element to light is not fixed, the control unit does not need to change the reference position of the dither matrix. Consequently, continuous lighting of the light emitting element can be more appropriately controlled to be reduced.

In the first exemplary embodiment, the light emitting element group 1061 is arranged in one row in the main scanning direction on the printed circuit board 1062 of the exposure head 106. However, in a case where an organic EL element is applied to the light emitting element, a printing operation is performed on a light emitting surface with respect to the printed circuit board 1062. Thus, a plurality of rows of light emitting element groups 1061 can be readily arranged. In a third exemplary embodiment, control processing performed on a plurality of rows of light emitting element groups 1061 is described.

[Configuration of a Plurality of Light Emitting Element Groups]

Figure 14:
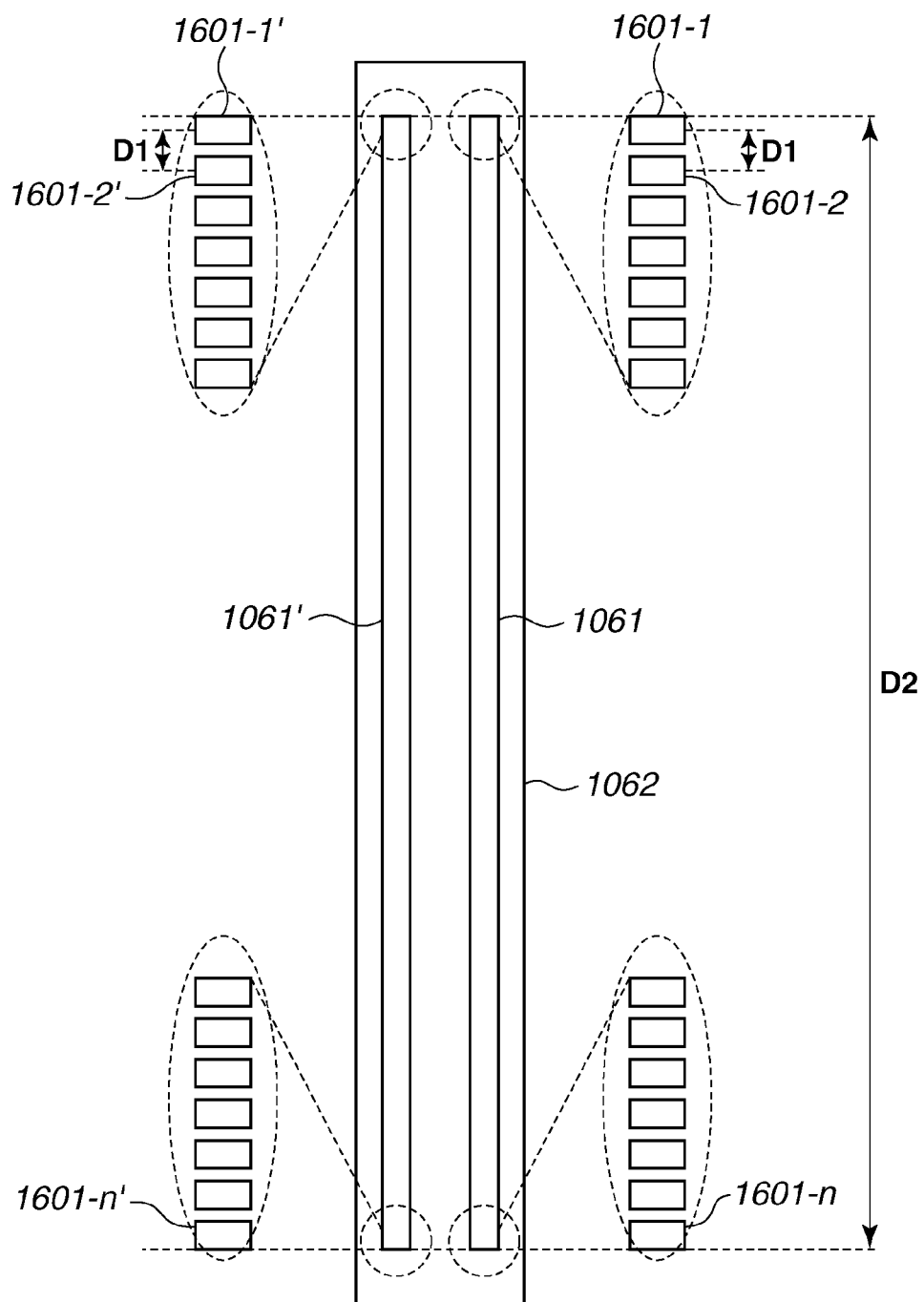
FIG. 14 is a diagram illustrating an arrangement of a substrate and light emitting elements inside an exposure head according to a third exemplary embodiment.

FIG. 14 is diagram illustrating a configuration in which light emitting element groups are arranged in two rows as the exposure head 106. In FIG. 14, components similar to those described above in FIG. 3 are given the same reference numerals. Unlike the diagram illustrated in FIG. 3, the light element groups are arranged in two rows on the printed circuit board 1062 in FIG. 14. That is, in addition to the light emitting element group 1061 illustrated in FIG. 3, a second-row light emitting element group 1061' having the same resolution as a first-row light emitting element group 1061 is arranged. Since these light emitting element groups 1061 and 1061' have the same resolution, a distance D1 between light emitting elements in the first-row light emitting element group 1061 is not different from that in the second-row light emitting element group 1061'.

[Change of Dither Matrix Reference Position in Main Scanning Direction and Sub-scanning Direction]

Figure 15:
FIG. 15 is a diagram illustrating dither matrix coefficients according to the third exemplary embodiment.

One application example of the exposure head 106 including the two rows of the light emitting element groups is as follows. The exposure head 106 is used to correspond to two beams in a laser scanning method for performing polarization scanning with a laser beam by using a polygonal mirror drive motor. That is, the first-row light emitting element group 1061 is used to expose on odd-numbered lines of image data to be printed, whereas the second-row light emitting element group 1061' is used to expose on even-numbered lines of the image data to be printed. In such a configuration, the shift of the dither matrix reference position described above can be diversified. That is, the reference position of the dither matrix can be shifted not only in the main scanning direction, but also in the sub-scanning direction. FIG. 15 is a diagram illustrating a dither matrix shifted by one in the main scanning direction (in a right direction) and one in the sub-scanning direction (in a downward direction) relative to the dither matrix illustrated in FIG. 6. Since the dither matrix is shifted by one in the main scanning direction, dither matrix coefficients on the rightmost side in FIG. 6 are arranged on the leftmost side in FIG. 15. Moreover, with the dither matrix shifted in the main scanning direction as a reference, dither matrix coefficients at the bottom in FIG. 6 are arranged as dither matrix coefficients at the top in FIG. 15.

With the dither matrix illustrated in FIG. 15, a result of the dither processing performed on the image data which is uniformly 13 (approximately 5% of range: highlight) is illustrated in FIG. 16A. Similarly, FIG. 16B is a diagram illustrating a result of the dither processing performed on the image data which is uniformly 26 (approximately 10% of range: highlight). Since the reference position of the dither matrix to be applied is shifted by one pixel in the main scanning direction, positions of the light emitting elements illustrated in FIG. 16A are shifted by one pixel in the main scanning direction (in the right direction) relative to the diagram illustrated in FIG. 7A. However, in the third exemplary embodiment, the light emitting element groups are arranged in two rows, and the light emitting element groups to be used are changed depending on the odd-numbered lines and even-numbered lines. Accordingly, if 12 pixels in the main scanning direction and 6 pixels in the sub-scanning direction are provided as a unit, light emitting element positions in a first row are a fifth pixel and an eleventh pixel. Moreover, light emitting element positions in a second row are a second pixel and an eighth pixel. Similarly, light emitting element positions illustrated in FIG. 16B are shifted by one pixel in the main scanning direction (in the right direction) relative to those illustrated in FIG. 7B. In this case, the light emitting element groups to be used are changed depending on the odd-numbered lines and even-numbered lines as similar to the above case. Accordingly, if 12 pixels in the main scanning direction and 6 pixels in the sub-scanning direction are provided as a unit, light emitting element positions in the first row and the second row are a second pixel, a fifth pixel, an eighth pixel, and an eleventh pixel. Herein, although the light emitting element positions in the first row and the second row are the same, the lighting frequency of the light emitting elements is lower than that in which the light emitting element group is arranged in one row as illustrated in FIG. 7B.

Accordingly, in a case where a plurality of rows of light emitting element groups is arranged in the exposure head 106, the dither matrix reference position used in the dither processing by the halftone processing unit 405 can be shifted not only in the main scanning direction, but also in the sub-scanning direction. Therefore, the reference position of the dither matrix can be changed according to the number of rows of the light emitting element groups in the exposure head 106, an arrangement of a sub-matrix used in the dither processing, or an angle allowing line growth. Such a change in the reference position enables continuous lighting or the frequency of continuous lighting of the light emitting element to be reduced.

In the third exemplary embodiment, the control processing described in the second exemplary embodiment may be executed. That is, the reference position of the dither matrix may be determined whether to be shifted according to the image data input to the halftone processing unit 405. In addition, the reference position of the dither matrix may be shifted by independent shift amounts in the main scanning direction and a sub-scanning direction according to the image data input to the halftone processing unit 405.

Although the light emitting element of the printing apparatus has been described as an example, the processing described with reference to the flowcharts in the exemplary embodiments can be applied to a printing apparatus having one or a plurality of elements per pixel such as an inkjet-type ink discharge element. Moreover, the application of each of the exemplary embodiments is not limited to the printing apparatus. For example, a host computer in which an application (e.g., PHOTOSHOP®) capable of performing dither processing is installed can perform the processing described above with reference to the flowcharts, although the host computer does not necessarily execute a printing operation. Such an application in the host computer can acquire a dither processing result (an application result of dither processing), and the acquired dither processing result is often transmitted to such a printing apparatus including a printing element. Thus, the host computer can perform the processing described above with reference to the flowcharts.

In the present specification, an element such as a light emitting element and an ink discharge element used for a printing operation is called the printing element.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-080804 filed Apr. 8, 2013, which is hereby incorporated by reference herein in its entirety.

What is claimed is:

1. A method performed by a processor in an apparatus, the method comprising:
   applying a same dither matrix to images; and
   printing the images to which the same dither matrix has been applied, on a sheet,
   wherein, phases of the dither matrix to be applied to different jobs are shifted, and phases of the dither matrix to be applied to different pages in a same job are not shifted.

2. The method according to claim 1, wherein the phases of the dither matrix to be shifted are shifted in a main scanning direction.

3. An apparatus comprising at least one processor and a memory coupled to the processor storing instructions that, when executed by the processor, cause the processor to function as:
   a dither applying unit configured to apply a same dither matrix to images; and
   a printing unit configured to print the images to which the same dither matrix has been applied by the dither applying unit, on a sheet,
   wherein in the dither applying unit, phases of the dither matrix to be applied to different jobs are shifted, and phases of the dither matrix to be applied to different pages in a same job are not shifted.

4. The apparatus according to claim 3, wherein the phases of the dither matrix to be shifted are shifted in a main scanning direction.

5. A non-transitory computer-readable medium storing a computer program for causing a computer to execute a method, the method comprising:
   applying a same dither matrix to images, such that phases of the dither matrix to be applied to different jobs are shifted, and phases of the dither matrix to be applied to different pages in a same job are not shifted; and
   printing the images to which the same dither matrix has been applied, on a sheet.

6. The method according to claim 5, wherein the phases of the dither matrix to be shifted are shifted in a main scanning direction.

* * * * *